May 7, 1963 C. H. SCHAAR 3,088,843
METHOD OF PERFORATING
Filed Nov. 23, 1960
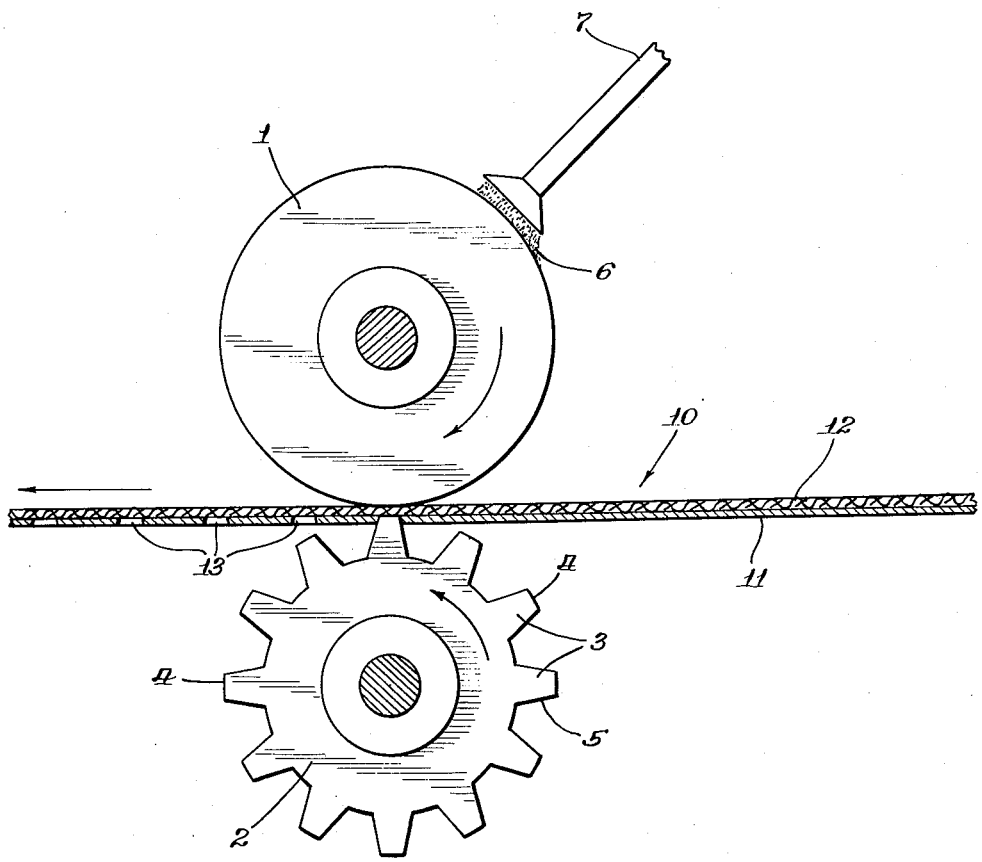
INVENTOR.
Charles H. Schaar
BY

United States Patent Office 3,088,843
Patented May 7, 1963

3,088,843
METHOD OF PERFORATING
Charles H. Schaar, Chicago, Ill., assignor to The Kendall Company, Boston, Mass., a corporation of Massachusetts
Filed Nov. 23, 1960, Ser. No. 71,315
11 Claims. (Cl. 117—10)

This invention relates to a process of producing a patterned layer of thermoplastic material on a permeable carrier therefor. In particular, this invention relates to a process of producing perforations in a pressure-sensitive adhesive layer on a fabric tape backing.

The permeability of fabric backings, such as employed in surgical tapes and athletic strapping tapes, for example, is substantially reduced by the layer of pressure-sensitive adhesive applied to one side of the fabric. Although impermeability to moisture and air may be desirable for some applications of adhesive tapes, it may be undesirable when the tape is used to bind, or to hold wound dressings to, the body. When applied to the body, the adhesive layer of the tape is normally in direct covering contact with the skin. The adhesive layer obstructs the normal evaporation of fluids from the skin surface, resulting in some cases in a macerated skin condition.

Primarily for the purpose of reducing the incidence of maceration, it has been suggested to produce tapes with the adhesive layer perforated or applied in a pattern which does not completely cover the one side of the fabric backing. Perforate patterns of adhesive have been applied to permeable backings by means of processes similar to printing operations. Another method involves perforating the adhesive layer after the adhesive layer has been applied to the backing. Perforations have been produced by mere mechanical puncturing of the adhesive, such as by merely pushing needle-like projections through the adhesive. In view of the thermoplastic nature of the pressure-sensitive adhesive material, these projections have also been heated for the purpose of facilitating moving or shifting the adhesive as the projections are pressed into the layer to form the perforations therein. Preferably, rather blunt projections are employed in order to avoid cutting or otherwise rupturing the fabric backing.

Disadvantageously, the needle and heated projection methods of forming perforations in the adhesive layer cause some of the adhesive to strike-through the interstices of the fabric backing. In addition, fragments of adhesive tend to adhere to the fibers of the fabric in the portions of the fabric exposed by the perforations. These adhesive fragments reduce the permeability of the fabric at these places. Strikethrough of the adhesive is objectionable primarily for two reasons. The adhesive portions which have been pushed through to the other side of the fabric come into contact with the adhesive layer of the overlying convolution of the tape when wound in roll form. This increases the force which is necessary to unwind the roll of tape. In use, dirt particles become attached to the adhesive on the other side of the fabric. The tape, therefore, rapidly deteriorates in appearance. Appearance is particularly important in the case of surgical adhesive tapes.

This invention is an improvement in the method of perforating the layer of pressure-sensitive adhesives by pressing a heated projection through the adhesive layer and into contact with the backing. Generally, the improvement consists of the step of applying a liquid, preferably water, to the reverse side of the permeable tape backing and then pressing the heated projection into the adhesive layer while the liquid is on the backing. The temperature of the heated projection and the pressure employed in pressing the projection into the adhesive layer is sufficient to cause the portion of the adhesive layer in contact with the projection to recede, thereby forming a perforation in the layer, without piercing or rupturing the backing when the projection is brought into contact therewith. Strikethrough of the adhesive is reduced, if not eliminated. Adherence of adhesive fragments to the portions of the backing exposed by the recessed portions of the adhesive is reduced.

The process in accordance with this invention is shown in the drawings in which a suitable apparatus for conducting the process is schematically illustrated. Generally, a fabric backed pressure-sensitive adhesive tape 10, shown in cross-section, is passed through the nip between a pair of rotating rolls comprising a smooth surfaced roll 1 and a roll 2. The direction of rotation is shown by the arrows on the rolls. The surface of roll 2 consists of a plurality of projections 3. The surfaces 4 of these projections 3 are substantially flat and may have any configuration desired, depending upon the shape of the perforations desired in the adhesive layer. The numeral 5 designates the walls of the projections 3, the height of which is at least equal to the thickness of the adhesive layer to be perforated. Conveniently, roll 2 may be a knurled metal roll. Roll 1 may be made of metal or any other material suitable to provide a relatively hard surface for supporting the tape as it is pressed against the roll by the projections 4 of roll 2.

The projections 3 are heated by any suitable means. This may be accomplished by heating internally with an electric cartridge heater positioned centrally within roll 2. Roll 2 is driven, for example, by means of an electric motor, not shown in the drawings since the means of driving the roll forms no part of this invention.

Roll 1 is freely rotatable. Roll 1 rotates by means of frictional engagement with the adhesive tape 10 as the tape is engaged by the projections 3 and passes through the nip between rolls 1 and 2.

The tape 10 is fed into the nip between rolls 1 and 2 with the surface of the adhesive layer 12 facing toward the surfaces 4 of the projections 3. The tape 10 passes through the nip in the direction shown by the arrow. The fabric backing 11 comes into contact with a smooth surface of roll 1 as the tape is processed. The heated surfaces 4 of the projections 3 are pressed into the adhesive layer 10, and against the fabric 11, forming perforations 13 in the adhesive layer.

As previously explained, a liquid is applied to the fabric backing 11. The liquid may be conveniently applied to the backing at the nip by applying the liquid to the surface of roll 1, the liquid being carried thereon and coming into contact with the fabric backing at the nip between the two rolls. As shown in the drawing, a liquid 6 is applied to the surface of the roll by means of a sprayer 7. The liquid is carried on the surface of the roll 1 and is brought into contact with the fabric backing 11 at the nip between the rolls. Alternatively, the liquid may be applied directly to the fabric backing, for example, by spraying, prior to passing into the nip. The fabric backing need not be saturated with the liquid. When the portions of the adhesive layer are subjected to heat and pressure at the nip between the rolls, the adhesive shifts laterally and merges with the adhesive layer adjacent thereto. The tendency of the adhesive to strike-through the fabric and the tendency of adhesive fragments to adhere to the fibers of the fabric uncovered by the shifting adhesive is reduced in the case where liquid is applied to the backing.

The gap between the surfaces 4 on roll 2 and the smooth surface of roll 1 is adjusted so that it is no greater than the thickness of the fabric backing. Preferably, the two rolls may be pressed towards each other, for example, by applying weights to the axle around which roll 1 rotates.

The following examples specifically illustrate this process.

An 80 x 72 cotton print cloth was impregnated with a vinyl resin composition in accordance with the impregnation treatment described in U.S. Patent 2,884,342. A pressure-sensitive adhesive of the following composition was calendered upon one side of the fabric, forming a layer of adhesive about 0.003" thick thereon.

| Ingredients: | Parts by weight |
|---|---|
| Pale crepe | 31.4 |
| Tackifier resins | 31.0 |
| Plasticizers | 4.5 |
| Fillers | 33.0 |

The tackifier resins consisted of a mixture of hydrogenated rosin and partially polymerized rosin in about a 3:1 ratio. The plasticizers consisted of a mixture of a hydrocarbon wax, mineral oil, and lanolin. The fillers consisted of a mixture of zinc oxide, titanium dioxide, and Dixie clay. A mixture of N,N'-diorthotolylethylene diamine and hydrocarbon substituted diaryl amines in petroleum wax were added in an amount of about 0.3% of the total weight of the adhesive composition.

The adhesive tape was introduced into the nip between a smooth hard rubber roll and a knurled metal roll in the manner described with reference to the drawings. Both rolls were about 4" long, each having a diameter of about 2". The projections on the knurled roll were about 0.017" high, the surfaces of each projection having a parallelogram configuration measuring approximately 0.025" by 0.015". The projections were arranged in a staggered pattern on the roll. There were about 200 projections per square inch of roll surface.

The knurled roll was heated internally by an electric cartridge heater. The temperature of the surfaces of the projections on the knurled roll was about 325° F. The two rolls were pressed together at about 30 lbs. per inch pressure of roll length. The knurled roll was driven at a speed which drew the tape through the nip at about 6.6 feet per minute. The smooth roll rotated by means of frictional engagement with the tape backing.

Water was applied to the surface of the smooth roll, the water coming into contact with the fabric backing as the roll rotated. A thin film of water on the surface of the roll was sufficient. At the temperature employed, the water evaporated from the tape as the adhesive was perforated, the fabric being essentially dry after passing through the nip. The adhesive layer of the tape was perforated upon passing through the nip between the two rolls. The reverse side of the fabric to which the water had been applied was markedly free of adhesive strikethrough. The fibers of the fabric in the portions thereof uncovered by the perforation in the adhesive were substantially free of adhesive fragments adhering thereto.

Instead of applying water to the back of the fabric as described above, the process was conducted on the above described tape by applying concentrated aqueous ammonium hydroxide; also by applying chloroethane instead of water; and also by applying isopropanol instead of water. The preferred class of liquids are those liquids which are not solvents for the pressure-sensitive adhesive; however, liquids which exhibit solvent properties toward these adhesives have been successfully employed, but in general oleophobic liquids have given better results. Of the oleophobic liquids, water is preferred for obvious reasons. The liquid should be one that does not adversely affect the fabric backing or the layer of the pressure-sensitive adhesive and can be removed from the tape by evaporation, preferably under the conditions of elevated temperature and pressure employed for forming the perforations in the adhesive layer.

A tape made from the same 80 x 72 cloth described above, except that it was not subjected to the resin impregnation treatment, was made into a tape by calendering a 0.003" thick layer of a pressure-sensitive adhesive on one side thereof. The tape was processed under the same conditions as described above. The composition of the adhesive was as follows.

| Ingredients: | Parts by weight |
|---|---|
| Pale crepe | 37 |
| Tackifier resins | 33 |
| Fillers | 30 |
| Plasticizer | 1 to 2 |

The tackifier resins consisted of a mixture of the same resins set forth in the previous example, in addition to a small amount of a low molecular weight polyisobutylene. Zinc oxide, titanium dioxide and Dixie clay comprised the fillers. Synthetic beeswax was the plasticizer. Based on the weight of the ingredients, the following mixtures of additives were compounded with these ingredients: about 0.5% of a mixture of tetramethyl thiuramdisulfide and a zinc salt of 2-mercaptobenzothiazole and about 0.7% of a mixture of N,N'-diorthotolylethylene diamine, hydrocarbon diaryl substituted amines (in petroleum wax) and the adipic acid ester of ethyl substituted hexanediol.

A 56 x 48 cotton fabric was coated on one side thereof with a vinyl resin in accordance with U.S. Patent 2,887,403 and a 0.003" thick layer of a pressure-sensitive adhesive having the following composition was calendered on the uncoated side of the fabric.

| Ingredients: | Parts by weight |
|---|---|
| Pale crepe | 26 |
| GR-S | 26 |
| Tackifier resins | 26 |
| Fillers | 19 |

The tackifiers were a mixture of a polyterpene resin, partially polymerized wood rosin and disproportionated rosin. The fillers were a mixture of zinc oxide, silica, titanium dioxide, calcium sulfate and Dixie clay. Based on the weight of these ingredients, about 1.6% of a mixture of an alkylated polyhydroxy phenol dipentamethylenethiuram tetrasulfide and the zinc salt of 2-mercaptobenzothiazole was added.

The adhesive layer of this tape was perforated in the same manner as described above.

An 80 x 72 cotton fabric was subjected to a hydrocarbon wax treatment to impart water repellency thereto, in a manner well known in the textile art. A layer of pressure-sensitive adhesive described in the second example above was calendered on one side of this fabric. The layer of the pressure-sensitive adhesive was perforated in the manner described above.

It is to be understood that the process may be conducted with apparatus other than that specifically disclosed herein. The projections may be in the form of annular rims, parallel or intersecting, instead of the projections specifically described for roll 2 in the drawings. Instead of the specific apparatus herein disclosed, the process may also be conducted by means of reciprocating banks of projections in combination with any other means of applying a liquid to the permeable backing. In all instances, the projections should be pressed into the adhesive at least until the surface of the projections come into contact with the backing. The pressures employed in pressing the projections into the adhesive surface, the temperature of the projections and the rate at which the tape is processed are interdependent and, in turn, are determined by the thermoplasticity of the adhesive, thickness of the adhesive layer and backing, nature of the backing, and the openings in the backing. Generally, higher temperatures or higher pressures, or both, permit greater rates of processing.

In the range of operating conditions which will cause the adhesive to shift from the areas of applied pressure and heat, those conditions under which the liquid volatilizes from the backing as the adhesive layer is perforated are preferred. Generally, better definitions of the perforations in the adhesive were obtained in the adhesive layer of the tape of the first example as the temperature of the projections was increased from about 130° F. to about 325° F., the speed and pressure being about the same as set forth in that example.

Adhesive "picking" or transferring of adhesive fragments to the projections was avoided or maintained at an inconsequential minimum when operating within the temperature range specified. Adherence of adhesive fragments to the surfaces of the metal projections of the apparatus hereinabove described, which may tend to occur at lower temperatures, may be avoided or reduced by the simple expedient of coating or otherwise treating the surfaces of the projections with an adhesive repellant material, preferably a material which will not contaminate the adhesive layer. Among the many well known adhesive repellant materials which act as release agents, there are several commercially available silicone resins suitable for this purpose.

Perforated layers of pressure-sensitive adhesives have been produced in accordance with this invention on 80 x 72, 63 x 56, 56 x 48 and 44 x 44 fabrics. Although reference herein has been made specifically to woven cotton fabrics, it is to be understood other permeable fabrics or sheetings may be used, including, for example, permeable non-woven sheeting; provided, however, that the openings therein or interstices between the fibers of the backing are sufficiently small so that the adhesive layer does not bleed-through the backing under normal conditions of coating the adhesive thereon by calendering or solvent spreading and when subjected to conditions normally encountered in storage in roll form and in use.

What is claimed is:

1. A method comprising applying a liquid to one side of a permeable tape backing on the other side of which is positioned a layer of thermoplastic pressure-sensitive adhesive, pressing a heated projection into said adhesive layer toward the permeable backing to pierce said adhesive layer through to the surface of said backing at the interface between said adhesive layer and said backing, contacting the tip of said projection against the surface of said backing at said interface with no relative linear motion at the time of contact between said backing and said tip of the projection and then withdrawing the heated projection therefrom.

2. A method comprising applying a liquid to one side of a fabric backing on the other side of which is positioned a layer of a thermoplastic pressure-sensitive adhesive pressing a heated projection into said adhesive layer toward the fabric backing to pierce said adhesive layer through to the surface of said backing at the interface between said adhesive layer and said backing, contacting the tip of said projection against the surface of said backing at said interface with no relative linear motion at the time of contact between said backing and said tip of the projection, and then withdrawing the heated projection therefrom.

3. A method comprising applying water to one side of a fabric backing on the other side of which is positioned a layer of a thermoplastic pressure-sensitive adhesive, pressing a heated projection into said adhesive layer toward the backing to pierce said adhesive layer through to the surface of said backing at the interface between said adhesive layer and said backing, contacting the tip of said projection against the surface of said backing at said interface with no relative linear motion at the time of contact between said backing and said tip of the projection, and then withdrawing the heated projection therefrom.

4. A method comprising applying a liquid to one side of a permeable tape backing on the other side of which is positioned a layer of a thermoplastic pressure-sensitive adhesive, and passing the composite of said backing and the adhesive layer through the nip between a pair of rotating rolls comprising a smooth surfaced roll and a roll having heated projections thereon, said tape being passed into said nip with the surface of the adhesive layer facing towards the projections, the gap at the nip between the pair of rotating rolls being no greater than the thickness of the permeable tape backing, whereupon during rotation of said rolls and passage of the tape through said nip the heated projections are pressed into said adhesive layer toward said backing to pierce said adhesive layer through to the surface of said backing at the interface between said adhesive layer and backing and to contact the tips of said projections against the surface of said backing at said interface with no relative linear motion between said backing and the surface of said tips, said heated projections upon being withdrawn from said adhesive layer forming apertures in said adhesive layer exposing portions of said backing at said interface.

5. A method comprising applying a liquid to a fabric backing, on the other side of which is positioned a layer of a thermoplastic pressure-sensitive adhesive, and passing the composite of the fabric backing and the adhesive layer through the nip between a pair of rotating rolls comprising a smooth surfaced roll and a roll having heated projections thereon, said tape being passed into said nip with the adhesive layer facing towards the projections, the gap at said nip between the rotating rolls being no greater than the thickness of said fabric backing whereupon during rotation of said rolls and passage of the tape through said nip the heated projections are pressed into said adhesive layer toward said backing to pierce said adhesive layer through to the surface of said backing at the interface between said adhesive layer and backing and to contact the tips of said projections against the surface of said backing at said interface with no relative linear motion between said backing and the surface of said tips, said heated projections upon being withdrawn from said adhesive layer forming apertures in said adhesive layer exposing portions of said backing at said interface.

6. A method comprising applying water to one side of a fabric backing, on the other side of which is positioned a layer of a thermoplastic pressure-sensitive adhesive, and passing the composite of said fabric backing and adhesive layer through the nip between a pair of rotating rolls comprising a smooth surfaced roll and a roll having heated projections thereon, said tape being passed into said nip with the surface of the adhesive layer facing towards the projections, the gap at the nip between the rotating rolls being no greater than the thickness of said fabric, whereupon during rotation of said rolls and passage of the tape through said nip the heated projections are pressed into said adhesive layer toward said backing to pierce said adhesive layer through to the surface of said backing at the interface between said adhesive layer and backing and to contact the tips of said projections against the surface of said backing at said interface with no relative linear motion between said backing and the surface of said tips, said heater projections upon being withdrawn from said adhesive layer forming apertures in said adhesive layer exposing portions of said backing at said interface.

7. The method of claim 6 wherein the water is carried on the smooth surfaced roll and is applied to the one side of the fabric backing as the backing contacts the said roll at said nip.

8. The method of claim 6 wherein the water is volatilized at said nip.

9. The method of claim 7 wherein the water is volatilized at said nip.

10. A method comprising applying a liquid to one side of a permeable tape backing on the other side of which is positioned a layer of a thermoplastic pressure-sensitive adhesive, placing a smooth supporting surface against the side of the backing to which the liquid is applied, piercing the adhesive layer with a heated projection through to the surface of the backing at the interface between said adhesive layer and said one side of the backing, contacting the tip of said projection against the surface of said backing at said interface, and then withdrawing the heated projection therefrom, thereby forming an aperture in said adhesive layer exposing a portion of said backing at said interface.

11. The method in accordance with claim 10, wherein the liquid on the backing is volatilized during the piercing step rendering the tape backing substantially dry after the heated projection is withdrawn from said adhesive layer.

References Cited in the file of this patent

UNITED STATES PATENTS

| | | |
|---|---|---|
| 2,190,654 | Eichhorn | Feb. 20, 1940 |
| 2,861,006 | Salditt | Nov. 18, 1958 |